United States Patent
Samaras

(10) Patent No.: US 12,103,750 B2
(45) Date of Patent: Oct. 1, 2024

(54) PRINTED MATTE FINISH CARRIER

(71) Applicant: ILLINOIS TOOL WORKS INC., Glenview, IL (US)

(72) Inventor: Peter L. Samaras, Itasca, IL (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 382 days.

(21) Appl. No.: 17/543,336

(22) Filed: Dec. 6, 2021

(65) Prior Publication Data
US 2022/0089344 A1 Mar. 24, 2022

Related U.S. Application Data

(62) Division of application No. 16/188,534, filed on Nov. 13, 2018, now Pat. No. 11,352,180.
(Continued)

(51) Int. Cl.
*B65D 71/50* (2006.01)
*B29D 7/01* (2006.01)
(Continued)

(52) U.S. Cl.
CPC ............ *B65D 71/504* (2013.01); *B29D 7/01* (2013.01); *B65B 17/025* (2013.01); *B65B 59/001* (2019.05); *B65D 65/42* (2013.01); *B65D 2571/00351* (2013.01); *B65D 2571/0066* (2013.01)

(58) Field of Classification Search
CPC ........ B65B 59/001; B65B 17/025; B29D 7/01
See application file for complete search history.

(56) References Cited

U.S. PATENT DOCUMENTS 3,782,070 A * 1/1974 Erlandson ................. B65B 9/06
83/326
4,009,037 A * 2/1977 Mann ........................ C08J 7/02
430/539
(Continued)

FOREIGN PATENT DOCUMENTS

CN 1169940 A 1/1998
CN 1882438 A 12/2006
(Continued)

OTHER PUBLICATIONS

Jin, Yinhe, "The History of the Development of Chinese Packaging Printing Technology", 1st Edition, Qingdao Press, May 31, 2011 (pp. 236-242).
(Continued)

*Primary Examiner* — Lucas E. A. Palmer
(74) *Attorney, Agent, or Firm* — Pauley Erickson & Swanson

(57) ABSTRACT

A carrier and method of manufacture for a carrier that results in a package of containers includes a plastic sheet having an array of container apertures and a portion having a printed matte finish where the printed matte finish includes a lower coefficient of friction relative to a container than a remaining surface of the plastic sheet. A plurality of containers are each positioned within an aperture of the array so that the printed matte finish of the plastic sheet is positioned along an inner portion of the package and the remaining surface of the plastic sheet is positioned along an outer portion of the package.

15 Claims, 3 Drawing Sheets

Related U.S. Application Data

(60) Provisional application No. 62/585,251, filed on Nov. 13, 2017.

(51) Int. Cl.
  B65B 17/02 (2006.01)
  B65B 59/00 (2006.01)
  B65D 65/42 (2006.01)

(56) References Cited

U.S. PATENT DOCUMENTS

| | | | | |
|---|---|---|---|---|
| 4,024,038 | A * | 5/1977 | Luc | B29C 71/0081 |
| | | | | 264/435 |
| 4,401,211 | A * | 8/1983 | Pillman | B65D 71/504 |
| | | | | 206/150 |
| 4,709,808 | A * | 12/1987 | Balduff | C08L 73/00 |
| | | | | 206/427 |
| 5,695,050 | A * | 12/1997 | Weaver | B65D 71/504 |
| | | | | 206/153 |
| 5,931,292 | A * | 8/1999 | Focke | B65D 85/1081 |
| | | | | 206/459.5 |
| 6,122,893 | A * | 9/2000 | Weaver | B65D 71/504 |
| | | | | 53/201 |
| 6,138,437 | A * | 10/2000 | Focke | B65B 19/228 |
| | | | | 53/212 |
| 6,234,945 | B1 * | 5/2001 | Weaver | B65D 71/504 |
| | | | | 493/330 |
| 6,598,738 | B2 * | 7/2003 | Weaver | B65D 71/504 |
| | | | | 206/150 |
| 7,074,476 | B2 | 7/2006 | Weaver et al. | |
| 7,195,809 | B2 * | 3/2007 | Weaver | B65D 71/504 |
| | | | | 206/145 |
| 7,963,391 | B2 * | 6/2011 | Weaver | B65D 71/504 |
| | | | | 294/87.2 |
| 8,220,632 | B2 * | 7/2012 | Oi | A61F 13/551 |
| | | | | 206/440 |
| 9,315,309 | B2 * | 4/2016 | Olsen | B65D 71/504 |
| 9,573,745 | B2 * | 2/2017 | Olsen | B65D 71/504 |
| 11,352,180 | B2 * | 6/2022 | Samaras | B29D 7/01 |
| 2002/0004113 | A1 * | 1/2002 | Weder | A01G 5/04 |
| | | | | 428/141 |
| 2003/0148067 | A1 * | 8/2003 | Escobedo | B41J 11/70 |
| | | | | 156/219 |
| 2004/0147679 | A1 * | 7/2004 | Weaver | B65D 71/504 |
| | | | | 525/240 |
| 2005/0000842 | A1 * | 1/2005 | Timmerman | B26D 5/32 |
| | | | | 53/399 |
| 2005/0112322 | A1 * | 5/2005 | Weaver | B65D 71/504 |
| | | | | 428/131 |
| 2006/0191426 | A1 * | 8/2006 | Timmerman | B26F 1/38 |
| | | | | 101/24 |
| 2008/0053846 | A1 * | 3/2008 | Olsen | B65D 71/504 |
| | | | | 264/156 |
| 2008/0164323 | A1 * | 7/2008 | Samaras | B65B 27/04 |
| | | | | 235/494 |
| 2008/0168747 | A1 * | 7/2008 | Brophy | B65D 71/504 |
| | | | | 428/34.1 |
| 2012/0305436 | A1 * | 12/2012 | Seyffer | D21H 21/16 |
| | | | | 206/524.6 |
| 2018/0311919 | A1 * | 11/2018 | Moscaritolo | B32B 27/32 |
| 2019/0144185 | A1 | 5/2019 | Samaras | |

FOREIGN PATENT DOCUMENTS

| | | | | |
|---|---|---|---|---|
| CN | 103342920 A | | 10/2013 | |
| CN | 105176429 A | | 12/2015 | |
| DE | 69923007 T2 | * | 12/2005 | ........... B65B 51/067 |
| JP | 2003-12024 A | | 1/2003 | |
| SE | 509440 C2 | * | 1/1999 | ........... B41M 1/305 |
| WO | WO-2007031784 A1 | * | 3/2007 | ........... B65B 11/105 |

OTHER PUBLICATIONS

Zhu, Xinlian et al., "Plastic Printing Technology and Application", 1st Edition, Printing Industry Press, Jan. 31, 2014 (p. 34).

"Design and Production Theory of Takeshi Sasaki", 1st Edition, Shanghai People's Fine Arts Publishing House, Jul. 31, 2016 (p. 62).

State Intellectual Property Office, Shanghai China, English language version of Office Action for Chinese Application No. 201880073205.9, issued Aug. 3, 2022 (11 pages).

* cited by examiner

PRINTED MATTE FINISH CARRIER

CROSS-REFERENCE TO RELATED APPLICATIONS

This application is a divisional of U.S. patent application Ser. No. 16/188,534, filed on 13 Nov. 2018, which claims priority to U.S. Provisional Application Ser. No. 62/585,251, filed on 13 Nov. 2017. The U.S. Provisional Application is hereby incorporated by reference herein in its entirety and are made a part hereof, including but not limited to those portions which specifically appear hereinafter.

BACKGROUND OF THE INVENTION

Field of the Invention

This invention relates generally to a carrier such as used to unitize a plurality of containers such as cans or bottles, for example.

Discussion of Prior Art

It is known to use container carriers to unitize a plurality of containers. Typical containers include bottles, cans and other containers having a sidewall and a chime or raised rib around an upper portion of the container. Much of the prior art in this area, specifically container carriers constructed from polymeric materials, comprises devices that engage the chime or rib around the upper portion of the container. Another style of container carrier is the sidewall-applied carrier wherein the carrier engages the sidewall of the container.

Regardless of the style of container carrier, one challenge in the art is to provide a container carrier that can be used with a variety of containers, including different container diameters and containers having sidewalls with different qualities. Specifically, some containers may include sidewalls that utilize different paints or varnished finishes that may change the coefficient of friction between the container and container engaging portions of the multi-packaging device. Because the container engaging portions of the container carrier are generally elastic, which is governed by the modulus of elasticity or "modulus" of the container carrier, the container carrier relies upon the engagement of a stretched container engaging portion with the container sidewall or chime. Container diameters outside of a narrow range of diameters will either stretch the container engaging portion too much thereby permanently losing elasticity, called "neck-down," or not stretch the container engaging portion at all, both scenarios resulting in package failure.

In addition, container engaging portions may slide too easily or not enough relative to the sidewall of a container depending upon a coefficient of friction of the sidewall thus resulting in package failure. For example, if too much friction occurs between the container engaging portions of the carrier and the container sidewall, application of the carrier will destroy the integrity of the carrier or result in a misapplied carrier relative to the sidewall. Typically, in the past, moisture was added to the container or the carrier to permit free sliding of the carrier relative to the container, however, recent industry trends disfavor use of moisture or water in the packaging process.

Prior art container carriers have typically been constructed from a plastic sheet having a single, homogeneous surface having a single coefficient of friction. Prior art container carriers generally require several different versions or configurations to accommodate different container diameters or a certain sidewall smoothness. For example, a matte finish may be applied to an entire carrier to permit application of the carrier to containers having sidewalls with a high coefficient of friction. A disadvantage of the matte finish is that a matte finish results in a generally cloudy or opaque carrier that obscures or shrouds graphics on the containers and/or package. This clarity disruption has led to the implementation of striped matte chrome rolls which allow imparting a matte finish selectively only to those areas which contact a respective container during application, e.g., just down the center of carriers. Such processing, however, has proven to be very labor intensive as, for example, it requires changing of the extruder chrome rolls when going between matte and non-matte product requirements. Also, different carrier styles typically require the striped matte finish in different areas, requiring additional changeovers for carriers with a different configuration or manufacturing lanes.

In view of the above, it is desirable to provide a container carrier that can accommodate an increased range of containers without adversely affecting package aesthetics.

SUMMARY OF THE INVENTION

A carrier according to one preferred embodiment is constructed from a generally flexible plastic sheet that is preferably generally transparent and includes a generally smooth surface. According to a preferred embodiment, a matte finish is printed onto at least a selected portion of the plastic sheet.

The printed matte finish is preferably imparted to the plastic sheet via UV-curable flexography. For example, through the use of one or more rolls or rollers that impart or meter sufficient amount of ink, a printed matte finish is desirably applied or provided to or at a predetermined width and location on or along the plastic sheet. As will be appreciated, a wide variety of printed matte finishes such as including or involving sections, rings, bands or stripes, for example, are possible and are herein contemplated and encompassed.

Following application of the printed matte finish to the plastic sheet, portions of the plastic sheet include a smooth surface with a generally transparent appearance and portions include the printed matte finish that typically includes a generally cloudy appearance.

Thus, according to a preferred method of manufacturing carrier, the plastic sheet with the printed matte finish arranged in a desired location or locations is formed into individual carriers. According to a preferred embodiment of this invention, each carrier is formed so that the printed matte finish is longitudinally arranged and positioned between outer bands of the carrier and, more particularly, between outer edges of apertures in the carrier.

This configuration permits the printed matte finish to slide along container sidewalls during application to containers in the areas between apertures and avoid the tendency of the plastic sheet in that area to engage, drag and/or overstretch relative to the sidewall, particularly a sidewall having a high coefficient of friction or unfavorable surface finish relative to the carrier. Therefore, in a preferred embodiment of the invention, when individual containers are inserted into the carrier to create an assembled package, the containers are positioned within respective container apertures so that the printed matte finish contacts at least a portion of each container and thus permits the sidewall of the respective container to slide freely enough within container aperture to permit application of carrier to containers without destroying the carrier.

Accordingly, the portion of the carrier that includes the printed matte finish is preferably positioned along an inner portion of package. The outer bands of the carrier are thus generally transparent and free of the printed matte finish so as not to block graphics on containers or otherwise disrupt the aesthetics of the package. In addition, the outer bands are engaged with jaws for applying the carrier to the containers thereby permitting free application of the carrier without contact between each container and the outer bands of the carrier until the jaws disengage, at which time container to carrier friction is desired.

According to one aspect of the subject development, a method for manufacturing a container carrier having an array of apertures each for receiving a container is provided.

In accordance with one embodiment, such a method involves feeding a flexible plastic sheet across a roller. The method further involves printing a matte finish onto at least a portion of the plastic sheet and forming the plastic sheet into the container carrier into the plastic sheet so that the matte finish is positioned in a desired location.

BRIEF DESCRIPTION OF THE DRAWINGS

The above-mentioned and other features and objects of the subject development will be better understood from the following detailed description taken in conjunction with the drawings wherein.

DESCRIPTION OF PREFERRED EMBODIMENTS

Figure 1:
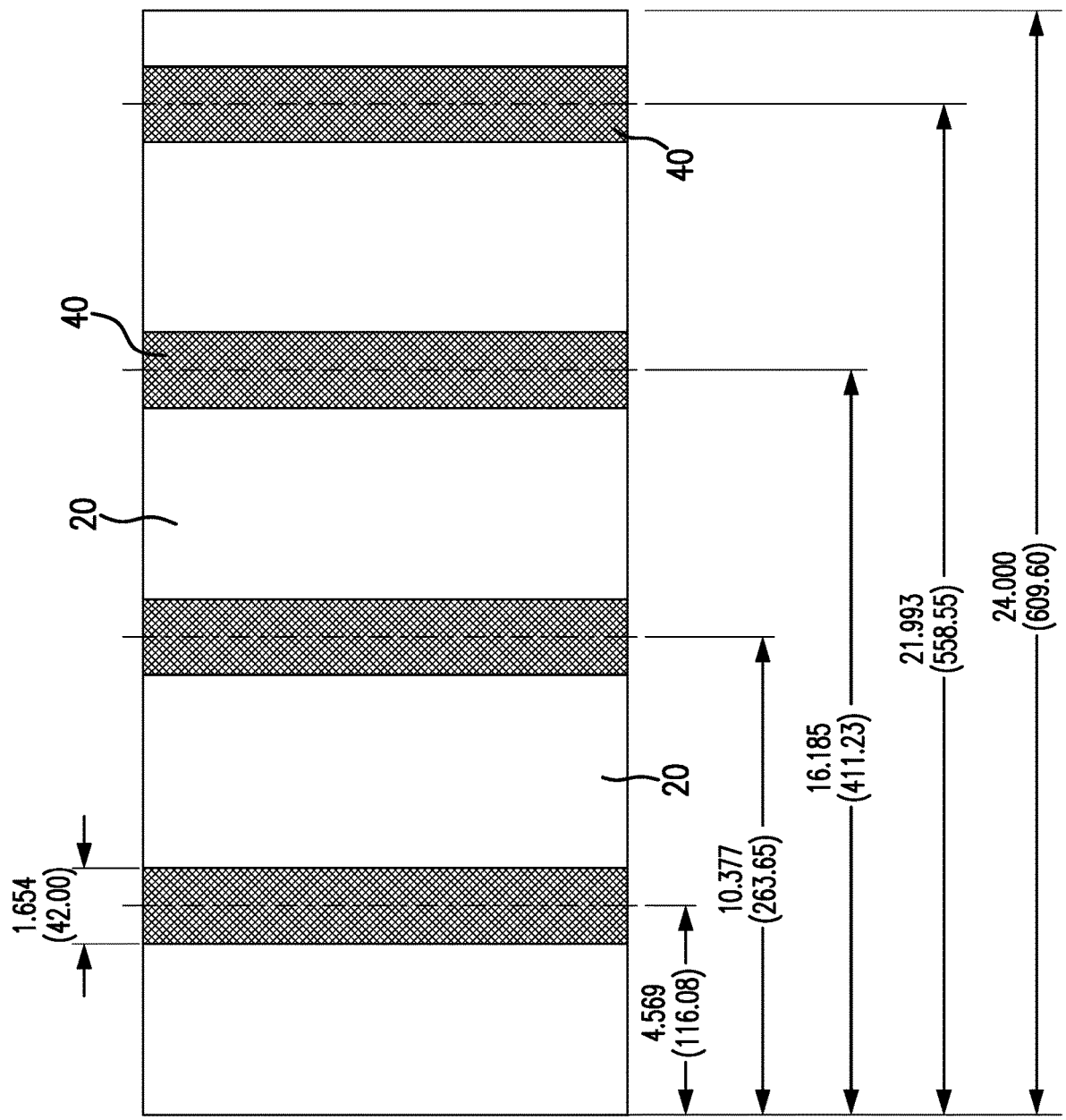
FIG. 1 is a top view of a plastic sheet according to one preferred aspect of the subject development.

FIGS. 1-4 show a representative method of manufacture, a carrier for carrying an array of containers and a package according to various preferred embodiments of this invention. The physical configurations of the carrier 10 and the package 50 are merely illustrative and, as will be appreciated by those skilled in the art and guided by the teaching herein provided, may be varied without departing from the principles of this invention.

In a manner similar to the types of multi-package carriers described above, carrier 10 according to one preferred embodiment of this invention is constructed from a thermoplastic material, preferably an extruded low- to medium-density polyethylene sheet material, or plastic sheet 20 having a generally smooth surface. Plastic sheet 20 is preferably generally transparent. As is common in plastic extrusion, plastic sheet 20 is extruded such that a longitudinal direction of plastic sheet 20 is in a machine direction, by definition the direction of the extrusion that is perpendicular to the face of an extrusion die, and the lateral dimension of plastic sheet 20 is in a transverse direction, the direction of the extrusion that is parallel with the extrusion die.

According to a preferred embodiment of this invention, matte finish is integrated, along a generally single plane, with plastic sheet 20 in carrier 10 so as to create discrete segments of printed matte finish 4050 integrated with respect to plastic sheet 20. The plastic sheet 20 shown in FIG. 1 has or includes printed matte in a four-stripe pattern such as may be desired for certain carriers. It is to be understood and appreciated that the broader practice of the subject development is not necessarily so limited as plastic sheets with printed matte patterns having a greater or lesser number of stipes as well as non-stripe patterns are contemplated and herein encompassed.

Matte finish 40 is preferably imparted to plastic sheet 20 by printing such as via UV-curable flexography. For example, standard 5 to 10 BCM (billions of cubic microns) anilox rolls can be used to meter sufficient amount of ink to the printing plates and then print a continuous stripe such as match the carrier lane centers.

In accordance with a preferred aspect of the development, printed matte areas desirably provide or result in a roughness value Ra of at least 100 microinches and, in accordance with one preferred embodiment, preferably in a range of 100 to 125 microinches. For comparison purposes, typical or commonly used standard chrome rolls are much smoother, such as having Ra values in a range of about 5 to 7 microinches.

In accordance with one preferred aspect of the development, extruded sheets can be desirably prepared for printing by undergoing corona pretreatment. For example, in accordance with one preferred embodiment, such corona treatment can or may involve standard electron discharge corona treatment of areas or selected areas to be printed, with such treatment typically involving application of a minimum of 38 dynes/cm$^2$.

Following application of printed matte finish 40 to plastic sheet 20, plastic sheet 20 may include portions having a smooth surface and generally transparent appearance and portions having a printed matte finish 40 that typically includes a generally cloudy appearance. In addition, printed matte finish 40 includes a lower coefficient of friction against container 60, specifically relative to a sidewall of container 60, than the smooth surface of the plastic sheet.

Thus, according to a preferred method of manufacturing carrier 10 according to this invention, plastic sheet 20 is fed across a roller following extrusion of plastic sheet 20. The roller then applies printed matte finish 40 to a desired portion of plastic sheet 20 and carrier 10 is subsequently formed from plastic sheet 20 so that printed matte finish 40 is positioned in a desired location.

As such, after printed matte finish 40 is integrated with, or otherwise applied to, plastic sheet 20, the resulting plastic sheet 20 is preferably stamped or die-cut to create individual carriers 10. As described, plastic sheet 20 is preferably die-cut after the integration of plastic sheet 20 and printed matte finish 40 for the preferred embodiment of this invention shown in FIGS. 1 and 2 and described above. Plastic sheet 20 is preferably formed using a punch press to die cut and extract material and create the features of carrier 10 described below and generally shown in FIG. 2.

Plastic sheet 20 having integrated printed matte finish 40 is die-cut to form a plurality of apertures 25, each aperture 25 capable of receiving container 60. A plurality of outer bands 35 are preferably positioned along outer portions of carrier 10 and partially define apertures 25. Outer bands 35 preferably do not include printed matte finish 40.

Apertures 25 are preferably arranged in an array of lateral rows and longitudinal ranks. As shown in FIG. 3, an additional preferable array is an arrangement of two lateral rows and three longitudinal ranks to form carrier 10 for holding six containers 60. Accordingly, rows of apertures 25, although extending lengthwise across plastic sheet 20, are counted laterally across a width of plastic sheet 20 and ranks of apertures 25, although extending widthwise across plastic sheet 20, are counted longitudinally along a length of plastic sheet 20. It should be noted, however, that although FIGS. 2 and 3 show carrier 10 for holding six containers 60, the invention is not intended to be so limited and carrier 10 may contain any feasible array of apertures 25.

Figure 2:
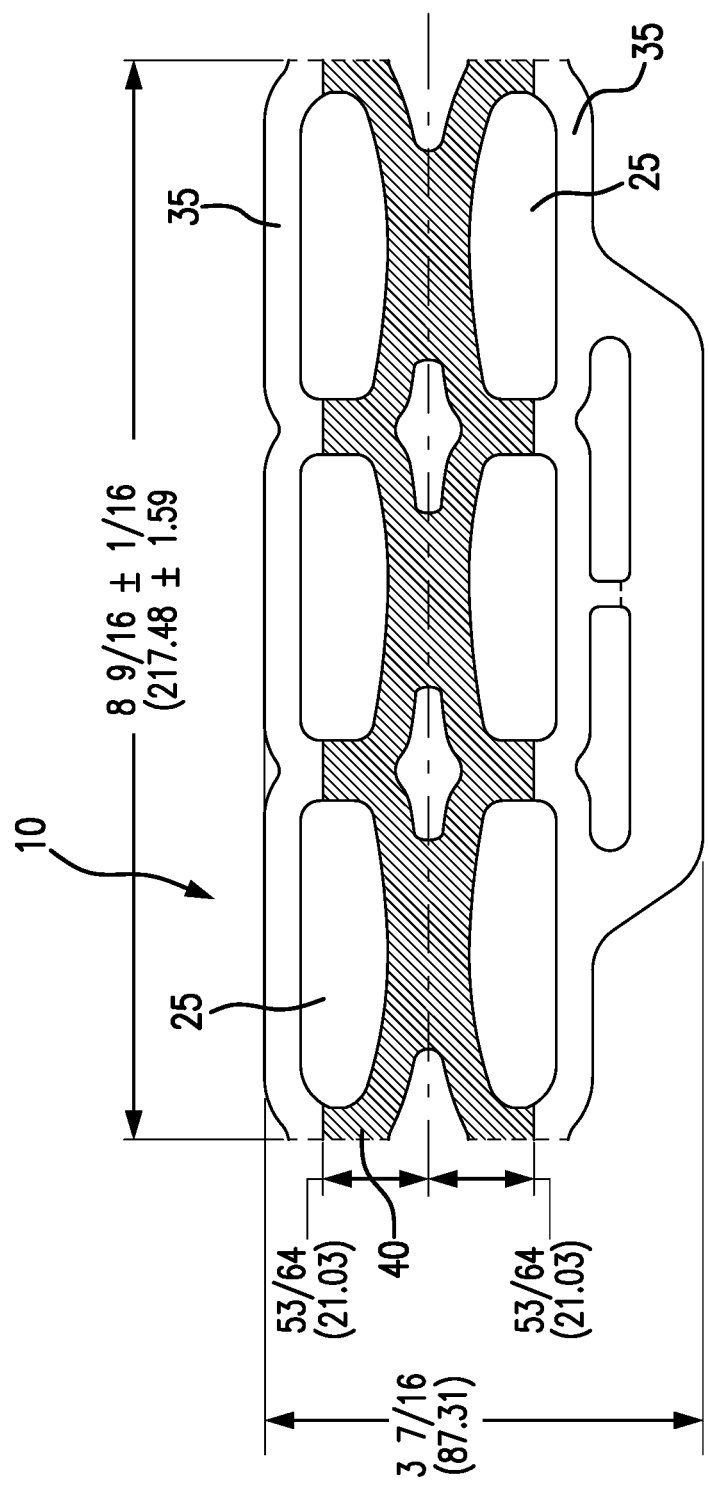
FIG. 2 is a top view of a plastic sheet during formation into carriers according to one preferred aspect of the subject development.
Figure 3:
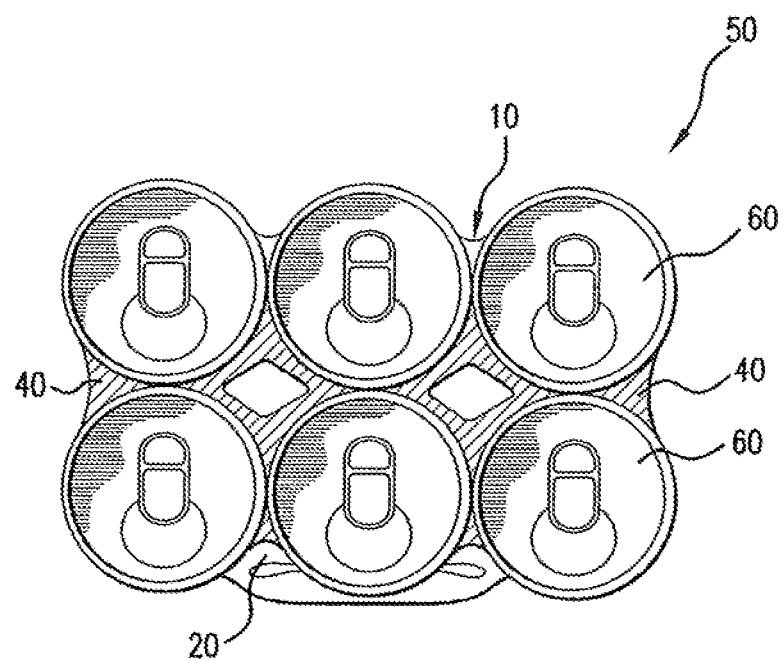
FIG. 3 is a top view of a package according to one preferred aspect of the subject development.

In one preferred embodiment of this invention, shown in FIG. 2, apertures 25 are formed so that printed matte finish 40 is longitudinally arranged and positioned between outer bands 35 and, more particularly, between outer edges of apertures 25 in the lateral rows of apertures 25. This configuration permits printed matte finish 40 to slide along container sidewalls in the areas between apertures 25 and avoids the tendency of plastic sheet 20 in that area to drag and overstretch relative to the sidewall of container 60.

Apertures 25 may comprise any suitable opening, preferably, though not necessarily, an elongated opening having an elongation in the longitudinal direction. As shown in FIG. 2, apertures 25 are narrower in the lateral direction than in the longitudinal direction.

When the preceding embodiment of carrier 10 is assembled into a package 50 such as shown in FIG. 3, the plurality of interconnected bands formed by plastic sheet 20 are positioned along the sidewalls of respective containers 60, for instance, approximately 1.5" from a top of each container 60. Package 50 preferably provides a reduced surface finish resistance along the portions of the plastic sheet 20 that include printed matte finish 40, specifically along a middle portion of plastic sheet 20 extending between outer bands 35 and more specifically between outer edges of apertures 25. A surface finish resistance of container 60 as used in this specification and claims is defined as the amount of resistance a sidewall of container 60 provides as carrier 10 is slid down its surface.

Figure 4:
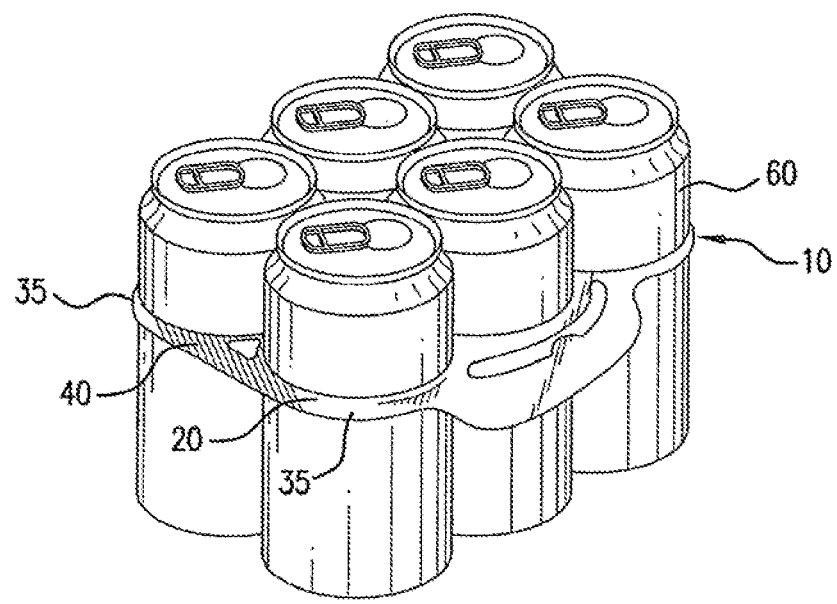
FIG. 4 is a perspective view of a package according to one preferred aspect of the subject development.

In a preferred embodiment of the invention shown in FIGS. 3 and 4, when containers 60 are inserted into carrier 10 to create an assembled package 50, containers 60 are positioned within respective container apertures 25 so that printed matte finish 40 contacts at least a portion of each container 60. This arrangement permits the sidewall of container 60 to slide freely enough within container aperture 25 to permit application of carrier 10 to containers 60 without destroying carrier 10.

Accordingly, the portion of plastic sheet 20 that includes printed matte finish 40 is preferably positioned along an inner portion of package 50. Outer bands 35 of carrier 10 are thus generally transparent and free of printed matte finish 40 so as not to block graphics on containers 60 or otherwise disrupt the aesthetics of package 50.

Carrier 10 will therefore unitize groups of containers having a range of diameters and a range of sidewall characteristics, including container sidewalls having high coefficients of friction. Carrier 10 according to this invention will permit a single carrier 10 to engage a relatively broad range of existing and conceivable containers.

In addition, according to another preferred embodiment of this invention, carrier 10 is engaged and applied to containers 60 by sets of moveable jaws (not shown). These moveable jaws typically engage carrier 10 along outer bands 35 and then stretch carrier 10 for application onto containers 60. As a result of the described embodiment, portions of carrier 10 that include printed matte finish 40 maintain exclusive contact with the sidewalls, and are slideable relative to the sidewalls, of the respective containers 60 until carrier 10 is applied to containers 60 and jaws are released from outer bands 35. Outer bands 35 are then released into engagement with containers 60 thereby providing a higher coefficient of friction relative to the sidewalls than printed matte finish 40 of carrier 10. This results in a package having containers 60 tightly and firmly maintained within carrier 10.

The claims are not intended to include, and should not be interpreted to include, means-plus- or step-plus-function limitations, unless such a limitation is explicitly recited in a given claim using the phrase(s) "means for" or "step for," respectively.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A method for manufacturing a container carrier having an array of adjacent rows and adjacent ranks of apertures each for receiving a container, the method comprising:
   feeding a flexible plastic sheet across a roller, wherein the flexible plastic sheet has a generally smooth surface;
   printing a matte finish to a portion of the plastic sheet in the form of a printed ink, wherein the printed matte finish is configured to contact the containers and has a roughness value Ra of at least 100 microinches;
   forming the plastic sheet into the container carrier so that the matte finish is positioned between the adjacent rows and the adjacent ranks of the apertures.

2. The method of claim 1 additionally comprising:
   corona treating of the plastic sheet in preparation for said printing of the matte finish.

3. The method of claim 2 wherein the corona treating comprises application of a minimum of 38 dynes/cm$^2$.

4. The method of claim 1 wherein the matte finish is printed via flexography.

5. The method of claim 4 wherein the flexography comprises UV-curable flexography.

6. The method of claim 1 wherein the printed matte finish is aligned in a plurality of longitudinal strips along the plastic sheet.

7. The method of claim 1 wherein the printed matte finish is positioned between outer edges of the plurality of container apertures.

8. The method of claim 1 wherein the printed matte finish has a different coefficient of friction relative to a sidewall of the container than the plastic sheet.

9. The method of claim 1 wherein the printed matte finish has a roughness value Ra in a range of 100-125 microinches.

10. The method of claim 1 wherein the printed matte finish comprises a UV-cured flexography ink.

11. The method of claim 1 wherein the matte finish has a different coefficient of friction relative to a sidewall of the container than the plastic sheet.

12. The method of claim 1 wherein the printed matte finish has a roughness value Ra in a range of 100-125 microinches.

13. The method of claim 1 wherein the portion of the sheet having the matte finish is positioned between the plurality of container apertures.

14. A container carrier manufactured by the method of claim 1.

15. A package of containers comprising:
- the container carrier of claim 14; and
- a plurality of containers positioned within respective container apertures so that the printed matte finish contacts at least a portion of each container of the plurality of containers.

* * * * *